Aug. 11, 1964         A. F. SCHIRMER         3,144,253
BALANCED MECHANICAL SEAL
Filed Nov. 6, 1961                           2 Sheets-Sheet 1

INVENTOR:
ALFRED F. SCHIRMER
BY
ATTORNEY

Aug. 11, 1964   A. F. SCHIRMER   3,144,253
BALANCED MECHANICAL SEAL
Filed Nov. 6, 1961   2 Sheets-Sheet 2
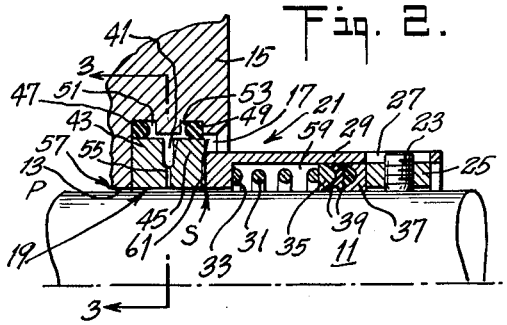
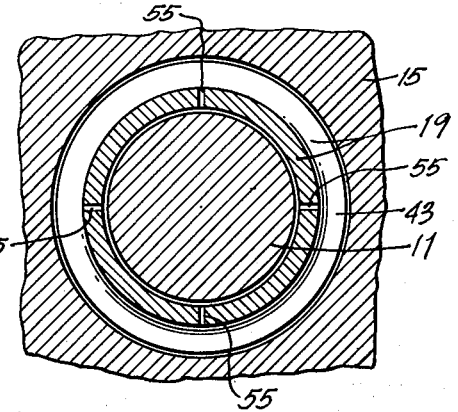
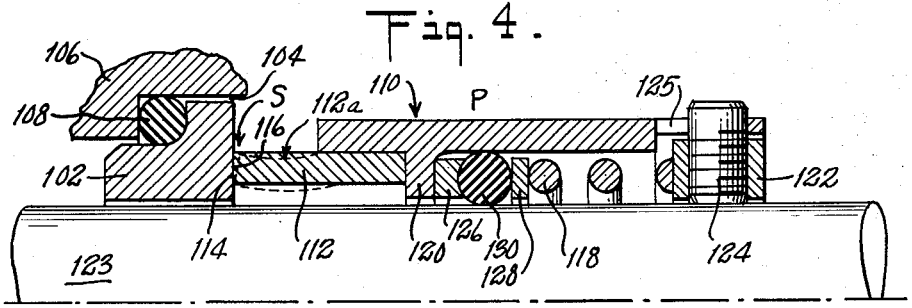
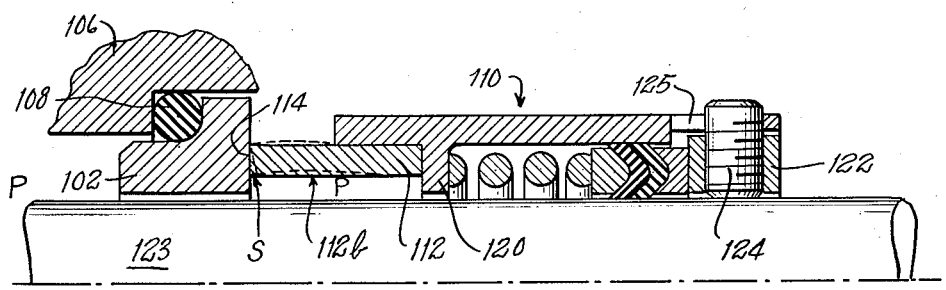
INVENTOR:
ALFRED F. SCHIRMER
BY
Robert Henderson
ATTORNEY United States Patent Office 3,144,253
Patented Aug. 11, 1964

3,144,253
BALANCED MECHANICAL SEAL
Alfred F. Schirmer, Rochester, N.Y., assignor to Garlock Inc., Palmyra, N.Y., a corporation of New York
Filed Nov. 6, 1961, Ser. No. 150,293
14 Claims. (Cl. 277—27)

This invention relates to a type of sealing device which has become known as a mechanical seal; the chief characteristic of such a seal being that a sliding seal is effected between two radially extending sealing faces associated with two relatively rotatable machine elements which are to be sealed relatively to each other. More particularly, this invention relates to improved means by which control is exerted to limit the unit load at which said sliding faces are interengaged to cause the seal to operate as a balanced seal.

Ordinarily, one of said sealing faces is on a first sealing member which is non-rotatable, and is capable of little or no axial movement while the other of said faces is on a second sealing member which is rotatable and is urged by fluid pressure, usually of the sealed fluid, toward the first sealing member, to maintain the two opposed radial faces of said members firmly in sliding sealing engagement.

Where such fluid pressure, applied at the back end of said second sealing member to urge the latter toward said first member, is at least partly counteracted by application of said pressure at the front end of said second sealing member, tending to urge said second sealing member away from said first sealing member, the seal has become known as a balanced seal. Such counteraction of the fluid pressure, hitherto provided to give the seal its balance characteristic, gives rise to several disadvantages as, for example, the necessity of designing the pressure-urged sealing member with front end and back end pressure-receiving surfaces of particular sizes to adapt the seal for a particular use, and the inability to provide such a seal which operates efficiently under conditions of varying pressures as in cycles and under intermittent conditions.

An important object of this invention is the provision of a balanced mechanical seal which, in response to pressure of the sealed fluid, brings the radial sealing face of the mentioned second sealing member into play as a pressure-receiving surface for providing the mentioned counteraction.

Another important object is the provision of a balanced mechanical seal adapted to respond to pressure of sealed fluid to so control the face-to-face interengagement of said two surfaces as to enable the seal to operate satisfactorily under changing pressures and in intermittent operation.

Another important object is the provision of a balanced mechanical seal of a given deseign, capable of efficient sealing of fluid at substantially different fluid pressures.

These objects are achieved by the present invention of which a number of embodiments are shown, for illustrative purposes, in the accompanying drawings, in which:

FIGURE 1 is a fragmentary, axial sectional view of an embodiment of this invention in which the pressure of the sealed fluid is effective at the outside of the seal.

FIGS. 1A–1G, inclusive, are enlarged axial sectional views each illustrating a different further embodiment of the non-rotatable sealing member shown within the broken line circle in FIG. 1.

FIG. 2 is a fragmentary, axial sectional view of a further embodiment of this invention in which, however, the pressure of the sealed fluid is effective at the inside of the seal.

FIG. 3 is a radial sectional view on the line 3—3 of FIG. 2.

FIG. 4 is a fragmentary, axial sectional view of still another embodiment in which the seal may be employed to yield the advantages of this invention where the pressure of the sealed fluid is effective at the outside of the seal.

FIG. 5 is a view, generally similar to FIG. 4, but illustrating a further embodiment wherein the pressure of the sealed fluid is effective at the inside of the seal.

Figure 1A:
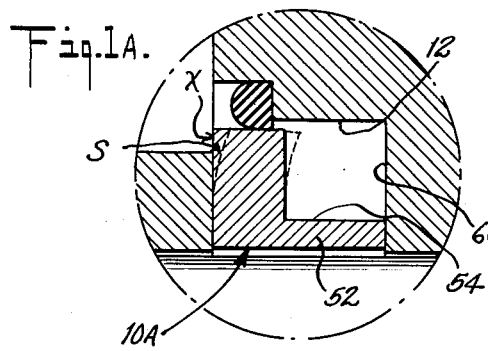
Figure 1:
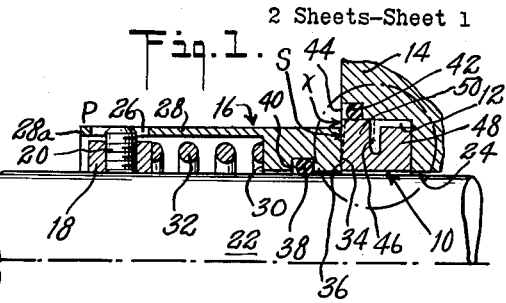

Referring to FIG. 1, the seal (of which, with a related shaft, only half is shown), comprises a stationary sealing ring 10, seated within an internal, annular recess or rabbet 12 of a machine casing fragmentarily shown at 14, and a rotary sealing ring 16 which, by means of a collar 18 and setscrew 20, is held upon and constrained to turn with a shaft 22 which extends through a circular shaft opening 24 in the machine casing.

The setscrew 20 extends outwardly sufficiently to engage within and in sliding relation to an axially extending slot 26 formed in a sleeve 28 which is rigidly integral with the rotary sealing ring 16 and extends rearwardly from an inner, rearwardly facing shoulder 30 of the latter ring.

A coil spring 32, encircling the shaft and compressed between the collar 18 and the shoulder 30, urges the rotary sealing ring 16 forwardly to hold opposed faces 34 and 36, respectively, of the rings 16 and 10 in sliding sealing engagement and to maintain such engagement during non-operation or when the shaft and seal are operating under conditions in which the sealed fluid is under low pressure.

An O ring 38, of soft rubber or rubber-like material, disposed in an internal, annular groove 40 in the ring 16 and radially compressed between the latter and the shaft, serves to provide a seal between the ring 16 and the shaft while permitting relative axial movement of the latter ring and the shaft. An O ring 42, of soft rubber or rubber-like material, disposed in a second annular rabbet or counterbore 44 in the machine casing 14 and radially compressed between the latter and the stationary sealing ring 10, serves to provide a static seal between the machine casing and the latter ring.

It will be understood that, except for certain conditions hereinafter explained, any fluid pressure of sealed gas or liquid within the machine casing at the exterior of the seal, as at P, would be effective at the narrow back end face 28a of sleeve 28, and also at the shoulder 30, to supplement the force of the spring 32 in pushing the ring 16 forcibly against the ring 10. This is highly undesirable, particularly where the sealed fluid is under high pressure and in the absence of the appliction of counteracting fluid pressure upon the ring 16; the principal disadvantages being excessive wear of one or both sealing rings, objectionably high power loss, and either difficulty or impossibility of starting shaft rotation under fluid pressure load conditions.

It has been customary, heretofore, to avoid or minimize the objectionable conditions mentioned in the preceding paragraph by so designing the interengaging faces of the rings 10 and 16 that the surface 34 instead of being so covered by the ring 10 as to be inaccessible to the fluid pressure within the machine casing, would have a substantial annular portion uncovered toward its outer periphery to be acted upon in a rearward direction by the sealed pressure in opposition to the pressure applied at areas 28a and 30. However, such a seal, commonly referred to as a balanced seal, must be designed with opposite end, pressure-receiving surfaces, of such relative areas as to achieve counteraction or balancing with reference to a particular pressure, or a very narrow range of pressures of the fluid to be sealed. Thus, a balanced seal designed for use under certain pressure conditions would not function satisfactorily under substantially different pressure conditions. As a result, different seal designs must be provided for use under substantially differing pressure conditions.

According to this invention, substantial areas of the surface 34 are made accessible to the sealed pressure by so distorting either the rotary sealing ring (as in arrangements hereinafter detailed) or the non-rotatable sealing ring as to provide an annular, radially extending wedge-shaped space between the two sealing surfaces 34, 36 and accessible to the sealed pressure.

More particularly, and as illustrated in FIG. 1, the non-rotatable ring 10, instead of being non-distortable as is ordinarily the case, is made distortable by the formation of a rather deep, annular groove 46 therein; and, if desired, the space provided by said groove may be enlarged by forming an inner end portion 48 of the ring 10 of an outside diameter less than the diameter of the rabbet 12 and less than the outside diameter of an outer end portion 50 of the ring 10.

The effect of the just-described arrangement is that the sealed pressure, applied at an annular area X of outer portion 50 of the ring 10, slightly distorts the ring 10 by bending the latter's portion 50 inwardly, as exaggeratedly indicated by broken lines, thereby forming a radially inwardly directed annular wedge-shaped space S between the surfaces 34 and 36 of the two sealing rings. The sealed fluid enters the space S so that the fluid's pressure operates upon a substantial area of surface 34 in opposition to the fluid pressure imposed upon surface areas 28a and 30.

Except as otherwise indicated, the various parts of the seal are metal. The non-rotatable ring 10 may be of a metal or other material suitable for its purpose as, for example, steel or a carbon composition of such design and physical and mechanical properties that it may become slightly distorted as indicated, without breaking.

It may be seen that, if a given seal is used under different substantial pressure conditions or under varying pressure conditions, the pressure applied on opposite ends of the rotary ring 16 will serve to give the same general effect as a conventional balanced seal; but advantageously, a given seal according to this invention is useful under a very wide range of fluid-pressure conditions. If the pressure of the sealed fluid is so low that the mentioned distortion of the ring portion 50 does not occur so that the wedge-shaped space S does not come into being, then the matter of balance is of little or no importance because the force of the low pressure plus the force of the spring 32 will not be sufficient to cause the difficulties hereinbefore mentioned.

It is to be noted, also, that while high fluid pressure may be continuously maintained in the machine casing and about the seal, no difficulty is encountered in starting operation of the shaft with the rotary parts of the seal thereon; this because the pressure maintains the wedge-shaped space, even when the shaft is not in operation. In that situation, the pressure balance of the ring 16 is maintained to minimize the force of its engagement with the ring 10, and the area of interengagement of the two rings 10 and 16 is kept at a minimum.

The inventive principle hereinbefore set forth can be employed in various other ways as illustrated in the other figures of the drawings and as hereinafter explained.

The embodiment of FIG. 1A differs from that of FIG. 1 only in that the inner end portion 48 of FIG. 1 is reduced in diameter to a mere sleeve 52 which abuts radial wall 60 of the rabbet 12, thus forming an annular rabbet 54 in stationary sealing ring 10A.

Figure 1B:
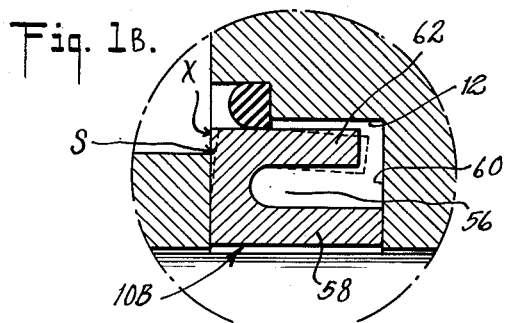

In the embodiment of FIG. 1B, the stationary sealing ring 10B is formed with an axially extending annular groove 56 at its inner end, separating the ring into an inner sleeve 58 which abuts wall 60 of the rabbet 12 and a shorter, outer sleeve 62 which is clear of wall 60. Under substantial fluid pressure imposed at X, the outer end and the sleeve 62 of the ring 10B become deformed as exaggeratedly shown in broken lines to form the wedge-shaped space S.

Figure 1E:
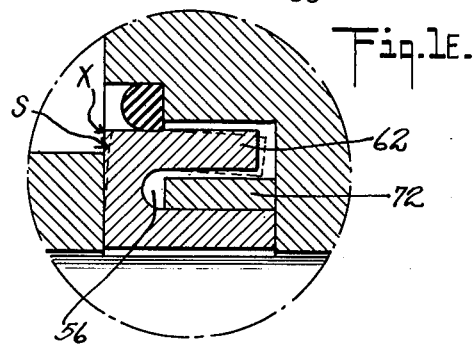
Figure 1C:
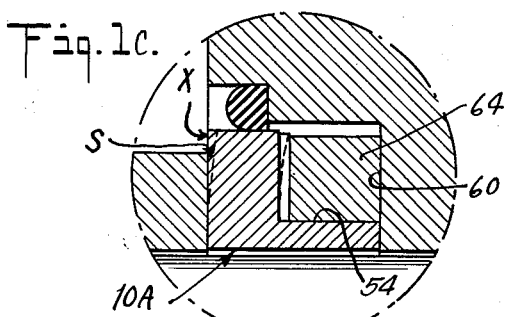

The embodiment of FIG. 1C differs from that of FIG. 1A only in including a solid metal ring 64 disposed within the rabbet 54 and against wall 60 as a means for positively limiting the deformation of the stationary sealing ring 10A.

Figure 1F:
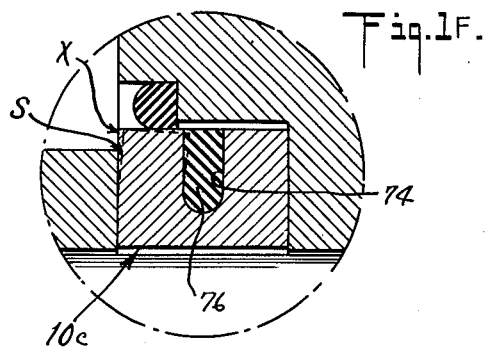
Figure 1D:
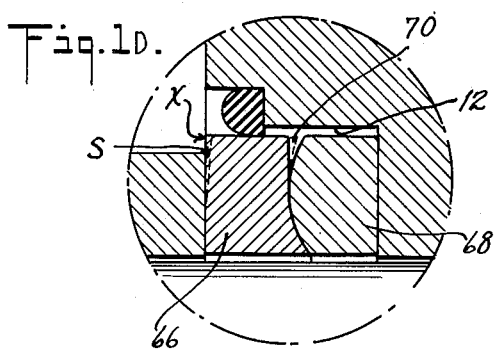

In the embodiment of FIG. 1D, the rabbet 12 is occupied by separate solid rings 66 and 68, shaped and partially internesting as illustrated in full lines. The ring 66 should be of such material as will render it suitable as a stationary sealing ring and to undergo limited distortion. The ring 68 may be of the same or of different material which need not be suitable for distortion. The internesting is intimate toward the inner peripheries of the two said rings. Toward their outer peripheries, however, the ring 68 is flared or spaced from the ring 66 to provide an annular space 70 into which an annular portion of ring 66 may move when the latter is pressure-distorted as exaggeratedly shown in broken lines.

The embodiment of FIG. 1E differs from that of FIG. 1B only in that the groove 56 is substantially occupied by a distortion-limiting ring 72 of metal or other suitably stiff or rigid material. Distortion, as exaggeratedly indicated in broken lines, is limited by engagement of the outer sleeve 62 with the ring 72.

The embodiment of FIG. 1F differs from that of FIG. 1 chiefly in that an annular groove 74 in stationary sealing ring 10C, corresponding somewhat to groove 46 of FIG. 1, is filled with rubber or rubber-like material 76. The material 76 constitutes means for restraining the deformation of ring 10C and its softness or resilience may be determined with reference to the extent of such restraint which may be desired. FIG. 1F also shows that the ring 10C may be of similar outside diameters at opposite sides of the groove 74.

Figure 1G:
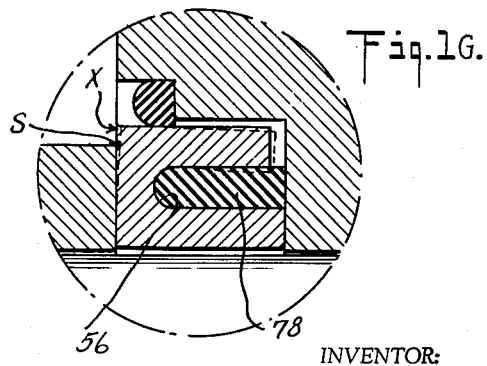

The embodiment of FIG. 1G differs from that of FIG. 1E only in that the groove 56 is occupied by rubber or rubber-like material 78 rather than by a rigid ring like ring 72. The rubber-like material in this embodiment has a deformation-restraining effect somewhat similar to that provided by the rubber-like material in the embodiment of FIG. 1F.

In the embodiment illustrated in FIGS. 2 and 3, the principal variation of the inventive concept resides in the non-rotatable sealing ring, although the illustrated rotary sealing ring assembly indicates clearly, upon comparison with FIGS. 1 and 4, that the rotary ring assembly may be modified in various ways within this invention.

Referring in detail to FIGS. 2 and 3, the shaft 11 extends through opening 13 in machine casing wall 15 which is formed at its outer face with an annular recess 17 within which non-rotatable sealing ring 19 is disposed. A rotary sealing ring 21 is constrained to turn with the shaft by a setscrew 23 which locks a collar 25 upon the shaft and has its outer end extending slidably into an axially extending slot 27 in a sleeve 29 which is rigidly integral with or as a part of the rotary sealing ring 21.

Within the sleeve 29, a coil spring 31 is compressed between a shoulder 33 and the collar 25 to maintain the sealing rings 19 and 21 in sliding sealing association. Held under compression between said spring and collar is a sealing assembly comprising rigid, opposite adapter rings 35 and 37 holding therebetween one or more sealing or packing rings 39 (two being shown) of suitable packing material, which effect a seal between the inner surface of sleeve 29 and the shaft. The arrangement is such that the seal between said sleeve and the shaft is maintained while some relative axial movement is permitted between the rotary ring 21 and the shaft.

Somewhat similarly to the above-described embodiments, the non-rotatable sealing ring 19 is made distortable by the formation of a recess therein shown as a rather deep, annular groove 41; this groove dividing the ring 19 into two rigidly integrated inner and outer portions 43 and 45. The latter portions are sealed, at their outer peripheries, with respect to the wall 15 by radially compressed rubber or rubber-like O rings 47 and 49 disposed respectively in radially inwardly facing annular recesses 51 and 53, to oppose leakage of fluid from groove 41 about the outer periphery of the ring 19. One or more radial bores 55 (four being shown) are formed in the ring 19, affording fluid connection between the groove 41 and a clearance area 57 between the shaft and the adjacent, inwardly facing cylindrical surfaces of the wall 41, the ring 19, and the ring 21.

The seal illustrated in FIGS. 2 and 3 is useful for sealing fluid which is under high pressure within the machine casing. Such high pressure, present at the area P, would also be present within the clearance 57, the bores 55, the groove 41 and an area 59 within the sleeve 29. The pressure in area 59 would be effective upon shoulder 33 to urge the rotary ring 21 forcefully against ring 19 thereby making desirable the opposing or balancing of such pressure for the reasons hereinbefore detailed.

Such opposition or balancing of the pressure imposed upon the shoulder 33 is provided in the embodiment of FIGS. 2 and 3 by the fluid pressure in groove 41 which distorts the portion 45 of ring 19 toward the ring 21 as exaggeratedly indicated in broken lines, thereby creating and maintaining (while the high pressure is maintained in the machine casing), a cross-sectionally wedge-shaped space S occupied by fluid, the pressure of which is imposed upon inner end surface 61 in opposition to fluid pressure imposed upon the shoulder 33.

The embodiments of FIGS. 4 and 5 differ from the other disclosed embodiments in that, among other differences, the sliding sealing surface of the rotary sealing ring is made accessible for the imposition of balancing pressure thereon by distortion or deflection of a portion of the rotary sealing ring.

The embodiment of FIG. 4 is adapted for use where the sealed fluid pressure is exterior of the seal as at P. In this embodiment, a rigid non-rotatable sealing ring 102 is disposed within an annular recess 104 in machine casing 106 and is sealed therein by a resilient rubber O ring 108. Rotary sealing ring 110 is fluid-tightly fitted with a cylindrical sealing nose 112 having a radial sealing surface 114 in sliding sealing engagement with a radial sealing surface 116 of the ring 102. The sealing nose is of steel or other suitable material which is deformable as hereinafter indicated.

Apart from the effects of fluid pressure, the sealing ring 110 is yieldably urged forwardly toward ring 102 by a spring 118 compressed between an inwardly extending radial flange 120 of the ring 110 and a collar 122 which is fixed upon shaft 123 by a setscrew 124 which extends slidably within an axially extending slot 125 in the ring 110. Between the flange 120 and the forward end of said spring is a packing assembly comprising a rigid adapter ring 126, a spring-seat ring 128 and, between the two latter rings, a rubber or rubber-like O ring 130 which effects a seal between the rotary sealing ring 110 and the shaft.

In FIG. 4, the parts of the seal are shown in full lines as when the device is installed but not subjected to material pressure of fluid to be sealed. The broken lines indicate exaggeratedly that, under substantial fluid pressure imposed upon the rearward faces of the rings 128 and 130, tending to urge the ring 110 forcibly against the ring 102, the cylindrical sealing nose 112 is deformed radially inwardly at a circumferential area 112a by the high pressure of the sealed fluid, thereby creating a wedge-shaped annular space S enabling sealed fluid in that space to impose its pressure against sealing surface 114 of the sealing nose in opposition to fluid pressure effective in a forward direction upon the rotary sealing ring 110. The seal, thereby, is enabled to function as a balanced seal.

The embodiment of FIG. 5 is adapted for use where the sealed fluid pressure is interior of the seal as at P. This embodiment differs from that of FIG. 4 only in the substitution of the spring and packing arrangement of FIG. 2 for the spring and packing arrangement of FIG. 4.

In FIG. 5, the reference characters correspond to those applied to corresponding parts in FIG. 4. The parts of the seal are shown in full lines as when the device is installed but not subjected to material pressure of fluid to be sealed. The broken lines indicate exaggeratedly that, under substantial fluid pressure imposed upon the rearward end of radial flange 120 of the rotary sealing ring tending to urge the latter forcibly against the ring 102, the cylindrical sealing nose 112 is deformed radially outwardly at a circumferential area 112b by the high pressure of the sealed fluid, thereby creating a wedge-shaped annular space S enabling sealed fluid in that space to impose its pressure against sealing surface 114 of the sealing nose in opposition to fluid pressure effective in a forward direction upon the rotary sealing ring 110. The seal, thereby, is enabled to function as a balanced seal.

The principles of this invention may be utilized in various ways other than those disclosed herein without, however, departing from the invention as set forth in the following claims.

I claim:

1. A mechanical seal for effecting a seal against the passing of a pressurized fluid between two relatively rotatable machine elements, said seal comprising a non-rotatable sealing ring sealed with respect to one of said elements, and a rotary sealing ring sealed with respect to the other of said elements; said rings having opposed annular sealing surfaces which are in sliding sealing association, and said rings being subject to the pressure of said fluid, tending to urge them toward each other and thereby tending to maintain said opposed sealing surfaces in intimate sliding engagement over their entire areas; said sealing surface of one of said rings being on a distortable portion of the latter ring which is capable of being so distorted as to cant its said sealing surface at all points therearound relatively to said opposed sealing surface of the other of said rings to form an annular wedge-shaped space between said opposed sealing surfaces and in communication with an ambient area adapted for occupancy by the sealed, pressurized fluid, said distortable portion having a circular, fluid-pressure receptive surface, additional to said opposed sealing surfaces, and so exposed to the sealed, pressurized fluid and located on said distortable portion as to render the latter responsive to the pressure of the sealed fluid to cause it thus to be distorted and to cant its said sealing surface and admit the pressure of the sealed fluid into the wedge-shaped space formed by such canting whereby to enable the thus admitted pressure to oppose the tendency of the sealed-fluid pressure to urge the said sealing rings toward each other.

2. A seal according to claim 1, said distortable portion being a part of said non-rotatable sealing ring.

3. A seal according to claim 1, said distortable portion being a part of said rotary sealing ring.

4. A mechanical seal for effecting a seal against the passing of pressurized fluid between a rotary shaft and a machine casing through a portion of which said shaft extends, said seal comprising a non-rotatable sealing ring sealed with respect to said casing, and a rotary sealing ring sealed with respect to said shaft; said rings having opposed annular sealing surfaces, in sliding sealing association, one of said rings having a deformable portion on which one of said surfaces is located, said deformable portion having a surface additional to said one of said sealing surfaces and being deformable by the imposition of pressure of sealed fluid upon said additional surface to form an annular, wedge-shaped space, defined by said sealing surfaces and open to the sealed fluid to enable pressure of the latter to be effective in said space in opposition to forces urging the two sealing rings toward each other.

5. A seal according to claim 4, said non-rotatable ring being formed with an annular recess dividing it into two wall portions and of such depth as to enable one of said wall portions to flex relatively to the other of said wall portions, the latter wall portion being adapted to receive axial thrust without material deformation and to maintain continuously said sliding sealing association with the other of said rings and said one of said wall portions constituting said deformable portion and being adapted to yield axially to fluid pressure imposed thereon to provide said wedge-shaped annular space.

6. A seal according to claim 5, said recess having means therein opposing excess yielding of said other of said wall portions.

7. A seal according to claim 6, said means being a rigid ring.

8. A seal according to claim 6, said means being rubber-like material.

9. A seal according to claim 5, said recess being a rabbet.

10. A seal according to claim 5, said recess being a radially outwardly facing groove.

11. A seal according to claim 5, said recess being an axially facing groove.

12. A seal according to claim 5, further including packing means between said non-rotatable ring and said machine casing and constituting said recess as a pressure chamber, and said non-rotatable ring being formed with a duct therein affording fluid connection between said pressure chamber and an area occupied by sealed fluid under pressure, whereby to enable pressure in said chamber to deform said one of said wall portions toward said rotary sealing ring to provide said wedge-shaped annular space between the two sealing rings.

13. A seal according to claim 4, said deformable portion being a part of said rotary sealing ring.

14. A seal according to claim 4, said deformable portion being a sealing nose having a cylindrical portion exposed to high fluid pressure of sealed fluid and distortable by such high fluid pressure to form said wedge-shaped annular space between said sealing nose and said non-rotatable sealing ring.

References Cited in the file of this patent

UNITED STATES PATENTS

| | | |
|---|---|---|
| 2,277,196 | Arf | Mar. 24, 1942 |
| 2,479,265 | Roshong | Aug. 16, 1949 |
| 2,761,712 | Ecker | Sept. 4, 1958 |
| 3,014,742 | Mayer | Dec. 26, 1961 |
| 3,061,319 | Snyder | Oct. 30, 1962 |

FOREIGN PATENTS

| | | |
|---|---|---|
| 783,197 | Great Britain | Sept. 18, 1957 |
| 881,439 | Great Britain | Nov. 1, 1961 |